United States Patent [19]
Stenneler

[11] Patent Number: 5,395,213
[45] Date of Patent: Mar. 7, 1995

[54] TURBOJET ENGINE ROTOR

[75] Inventor: Jacques M. P. Stenneler, Le Chatelet en Brie, France

[73] Assignee: Societe Nationale d'Etude et de Construction de Motors d'Aviation "SNECMA", Paris, France

[21] Appl. No.: 135,568

[22] Filed: Oct. 14, 1993

[30] Foreign Application Priority Data

Oct. 21, 1992 [FR] France ................... 92 12566

[51] Int. Cl.6 ................................ F01D 5/02
[52] U.S. Cl. ................................ 416/219 R
[58] Field of Search ............... 416/219 R, 220 R, 248

[56] References Cited

U.S. PATENT DOCUMENTS

| 3,661,475 | 5/1972 | Anderson et al. | |
| 3,891,351 | 6/1975 | Norbut. | |
| 4,135,857 | 1/1979 | Pannone et al. | 416/219 R |
| 5,067,876 | 11/1991 | Moreman | 416/219 R |

FOREIGN PATENT DOCUMENTS

| 2393930 | 1/1979 | France. | |
| 151707 | 11/1979 | Japan | 416/248 |
| 798613 | 7/1958 | United Kingdom | 416/219 R |
| 944166 | 12/1963 | United Kingdom. | |

Primary Examiner—Edward K. Look
Assistant Examiner—James A. Larson
Attorney, Agent, or Firm—Oblon, Spivak, McClelland, Maier, & Neustadt

[57] ABSTRACT

A turbojet engine rotor, wherein the circumference of the disk is occupied by teeth and slots in an alternating form. The teeth have a variable rigidity in the axial direction, which leads to different shapes of their cross-section. The teeth have a twisted outer surface and oblique recesses are provided on the circumference of the rotor for receiving vane roots which alternate with the teeth for separating and retaining the vanes.

1 Claim, 4 Drawing Sheets

TURBOJET ENGINE ROTOR

BACKGROUND OF THE INVENTION

1. Field of the Invention

The invention relates to a turbojet engine rotor, on whose circumference are provided oblique recesses for receiving vane roots and which alternate with teeth for separating and retaining the vanes. In the present invention, these teeth have cross-sections, whose shape varies along the rotor axis.

2. Discussion of the Background

In a known design of rotors having vanes for aircraft engines, the recesses are produced by axial or oblique pin settings and have invariable cross-sections over the entire rotor length. This also applies in the case of blade roots, which are slid into the recesses and between the teeth and which serve as supports for the blades.

In the general case where the gas circulation stream surrounding the rotor has a variable internal diameter, the vane roots have portions with a rectangular cross-section, whose height (i.e. extension in the radial direction) linearly varies along the rotor, without their thickness being modified. These portions connect the bulbs of the vane roots, which are located in the recesses, to the blades and contiguous platforms defining the circulation stream and they are referred to as poles.

In order to facilitate the transition of forces essentially due to the centrifugal field from the blade to the pole and then to the vane root, the object of the present invention is to minimize the offsets in the circumferential direction between the blade, the pole and the root, the optimum being to inscribe the section at the base of the blade, i.e. level with the platform, in the section of the pole. This is difficult to achieve due to the blade camber and the blade inclination in the circumferential direction called the setting.

To a certain extent the designer can take account of the blade camber by increasing the pole width, but this is clearly to the detriment of the mass. It is also possible to use oblique and not axial recesses in order to have the direction of the pole and the vane root as close as possible to the direction corresponding to the blade setting.

The use of oblique recesses (10°, 15° or more than 20°) as a function of the blade setting is opposed by the increase in the local stresses in the disk teeth and in the recesses, at locations where the direction of the pin settings intersects the ends of the rotor at an acute angle. Thus, in the disk recesses there is an X-shaped stress distribution, which is well known to the experts.

Research has been carried out by the applicant company with a view to lightening the vane roots by giving then variable, thinner shapes, at least outside the recesses, in order to reduce the material volume forming them and thus reduce the stresses in the teeth, but this solution was not adequate, because significant stress concentrations appear on the teeth of the disks due to heterogeneities of forces, particularly of a centrifugal nature, produced by the roots and which were due to variations of the cross-section and weight along the roots.

SUMMARY OF THE INVENTION

The present invention aims at obviating these stress concentrations by also varying the rigidity of the teeth in the axial direction according to various methods more particularly depending on the exact distribution of the forces of the pin setting direction.

The invention more specifically relates to a turbojet engine rotor having a disk notched with oblique recesses separated by teeth formed from a radially external widened portion and a neck joining the widened portion to a rim of the disk on which all the teeth are located, and vanes formed from a blade and a root located in one of the recesses. This construction is characterized in that the widened portions are formed by two adjacent portions each located on one side of the neck and wherein one becomes higher and the other less high along the pin settings, the portions becoming of less height towards the acute angle ends of the teeth and the pin settings being oblique. It should be noted that U.S. Pat. No. 3,661,475 describes teeth surmounted by crossed ribs for supporting platforms defining the circulation strewn and that the network of platforms is conical, so that the ribs have a variable height. However, this design differs from that according to the invention, because the teeth have a uniform cross-section and the ribs have scarcely any effect on the mechanical strength or resistance of the teeth to the forces produced during operation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1 and 1A show the construction according to the invention, the rotor being shown in section through the axis and then in the direction of the axis.

Figure 1:
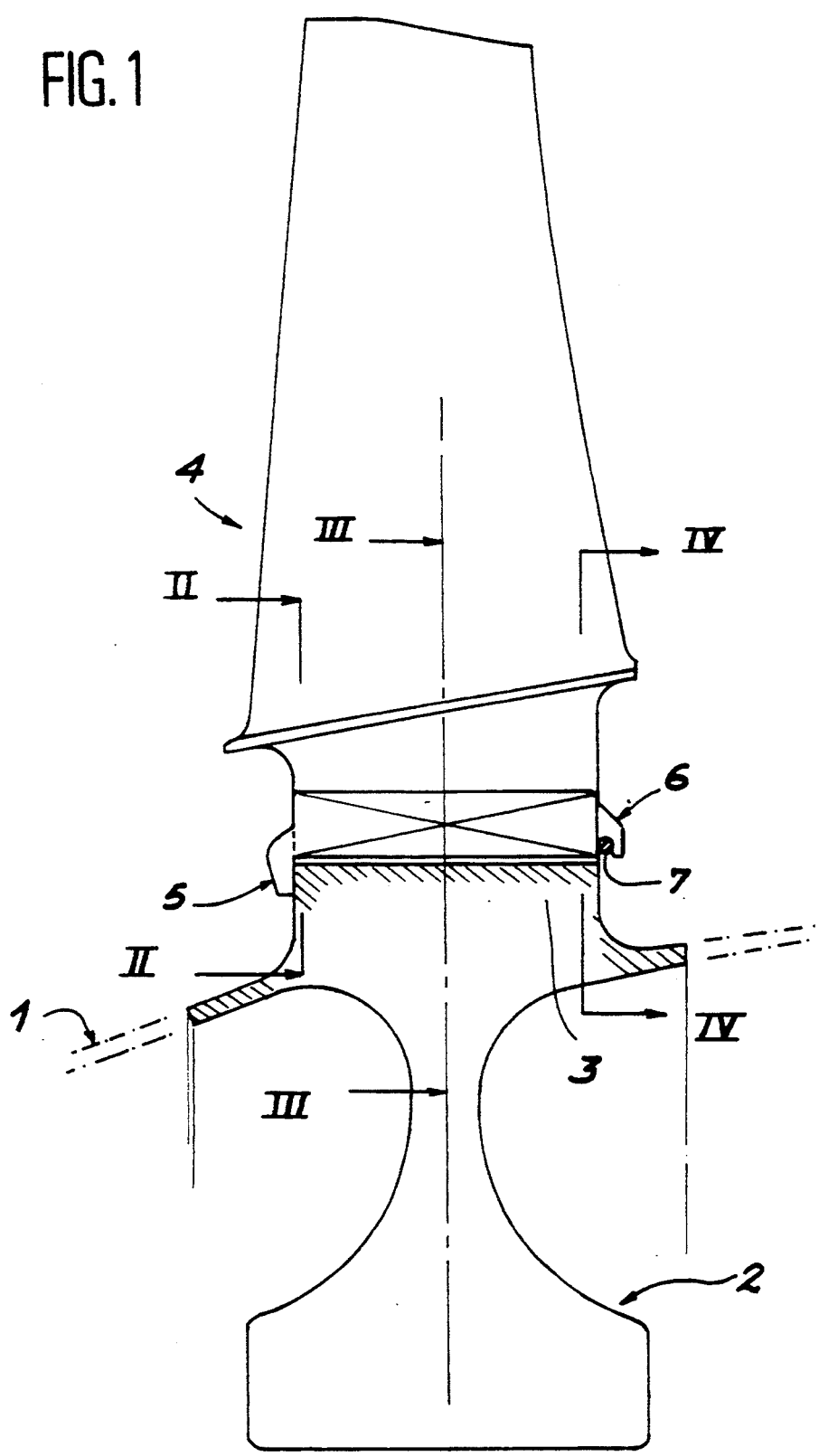
Figure 1:
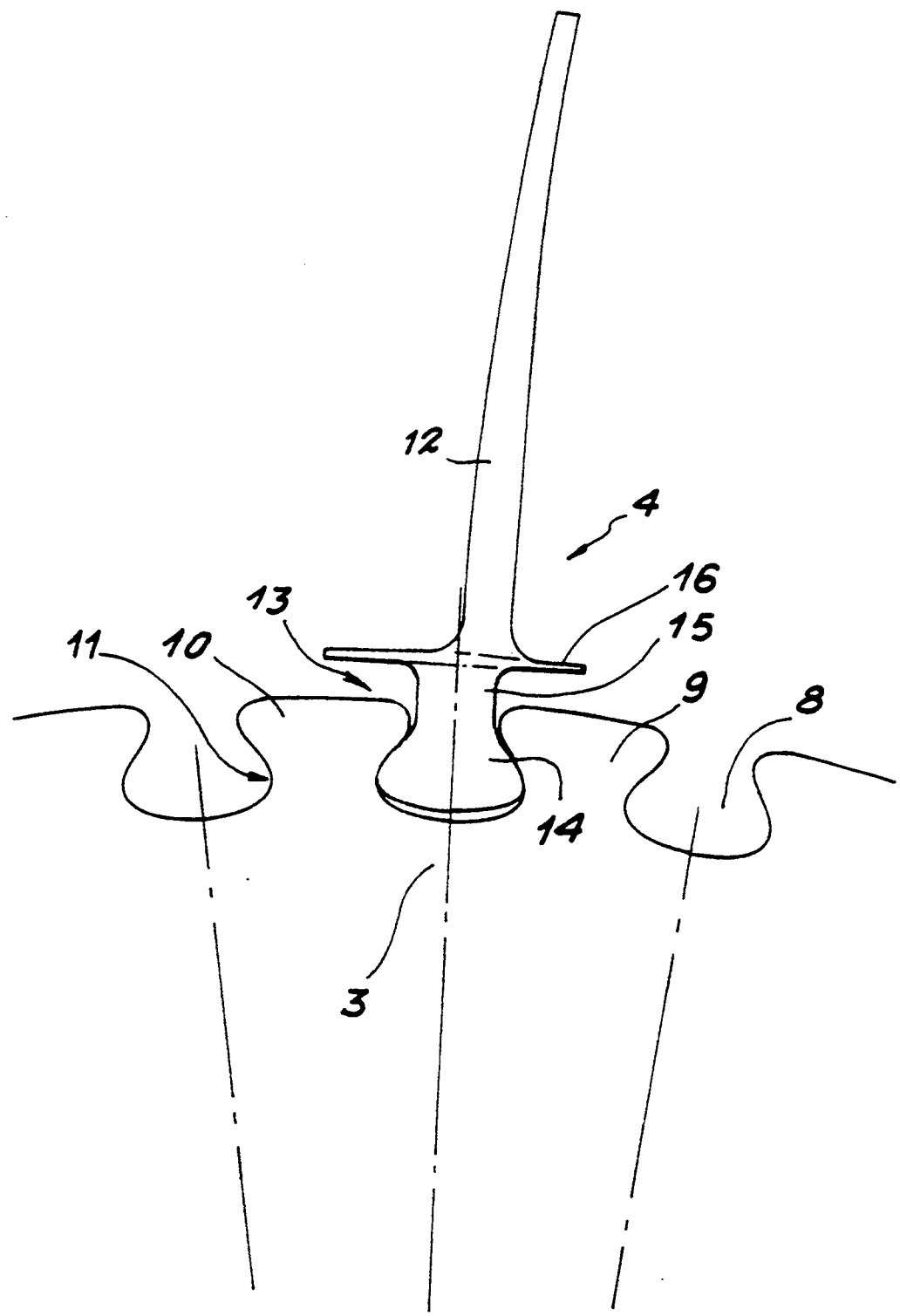

The rotor 1 of FIG. 1 comprises a disk 2, which must be connected to other disks e.g. by means of welding. The disk 2 has an external rim 3, which receives rotor vanes 4 or mobile vanes. In this specific construction, the root of each vane is engaged in the slot associated therewith by a rearward insertion movement and abuts against the front of the disk 2 by a beak member 5. The blades 4 are also provided at the rear with projections shaped like beaks 6. A circular joint 7 is then placed in the hollows defined by the beaks. The circular joint 7 prevents the vanes 4 from sliding towards the front, because it also extends in front of the teeth of the disk 2 between the beaks 6. This fitting procedure is of a conventional nature and is described in various publications.

FIGS. 1A, 2, 3 and 4 show that the rim 3 is formed from recesses 8 and teeth 9 in an alternating manner. Each of the teeth 9 is formed from a widening 10 located on the outside in the radial direction and a neck 11 connecting the widening 10 to the rim 3 of the disk 2, on which all the teeth 9 are located. The vanes 4 are formed from a blade 12 and a root 13, which is itself constituted by a bulb 14 engaged in an associated recess 8 beneath two consecutive widened portions 10 and a pole 15 extending between two consecutive widened portions 10 and projects to a greater or lesser extent beyond the sane. A platform 16 supports a blade 12. The pole 15 extends between the bulb 14 and the platform 16 and corresponds to a width reduction of the bulb 14. The platform 16 is relatively wide, because the blade 12 is curved and oblique and the platform 16 must be continuous to define the gas circulation stream.

Figure 2:
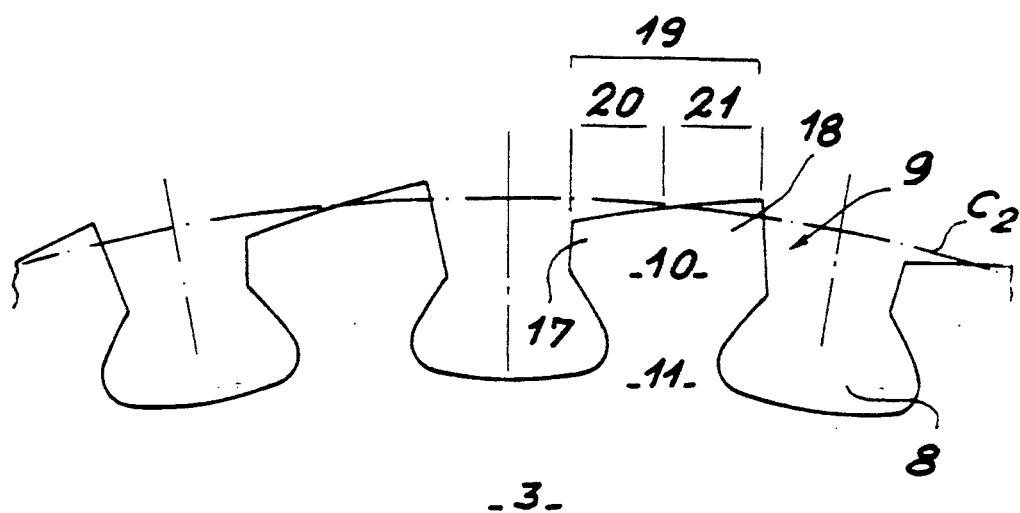
FIGS. 2, 3 and 4 respectively correspond to three cross-sections along lines II—II, III—III and IV—IV of FIG. 1.
Figure 3:
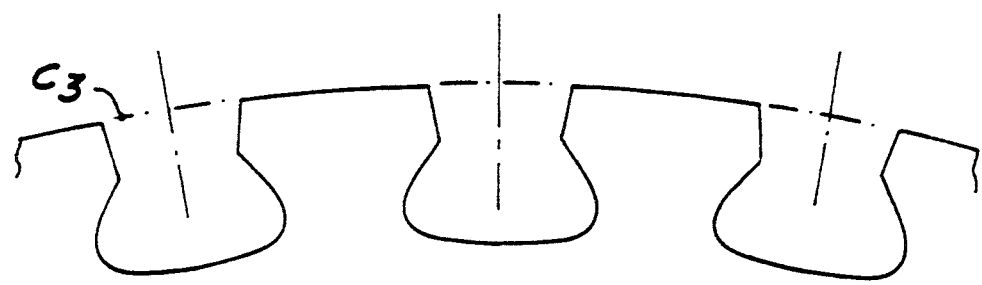
Figure 4:
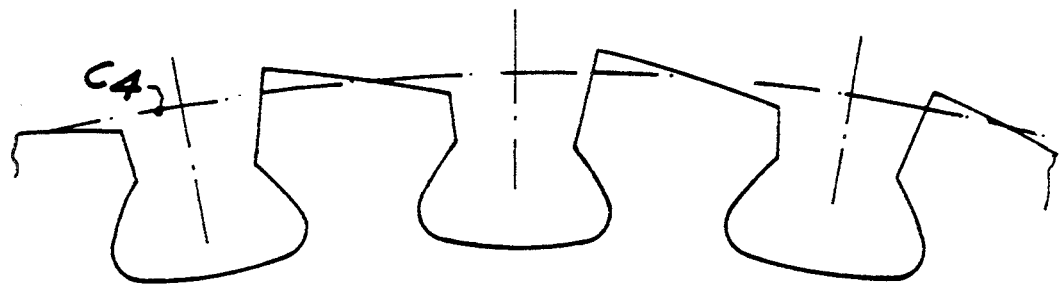

It is possible to distinguish a left-hand portion 17 and a right-hand portion 18 on each widened portion 10 (cf. FIG. 2). These portions 17 and 18 are adjacent, each on one side of the neck 11 and both radially defined towards the outside by an outer face 19. The originality of the construction according to the invention is that the face 19 has a slope or an inclination along the circumference of the disk 2, which varies for each cross-section. The face 19 has two roughly symmetrical sides 20, 21 to the left and right (each corresponding to one of the portions 17 and 18) in FIG. 2. The left side 20 bulges, whereas the right side 21 hollows out in FIG. 3 and even more in FIG. 4. On moving in the axial direction one of the portions becomes more and the other less voluminous. In other words, the disk 2 has a complex external shape formed by a projecting portion and a contracted portion with respect to the circles C2, C3 or C4 giving the intersection of a cylinder or a cone and a transverse plane. The external surface of the rim of the disk 2 is no longer a surface of revolution, as in the known designs.

Figure 5:
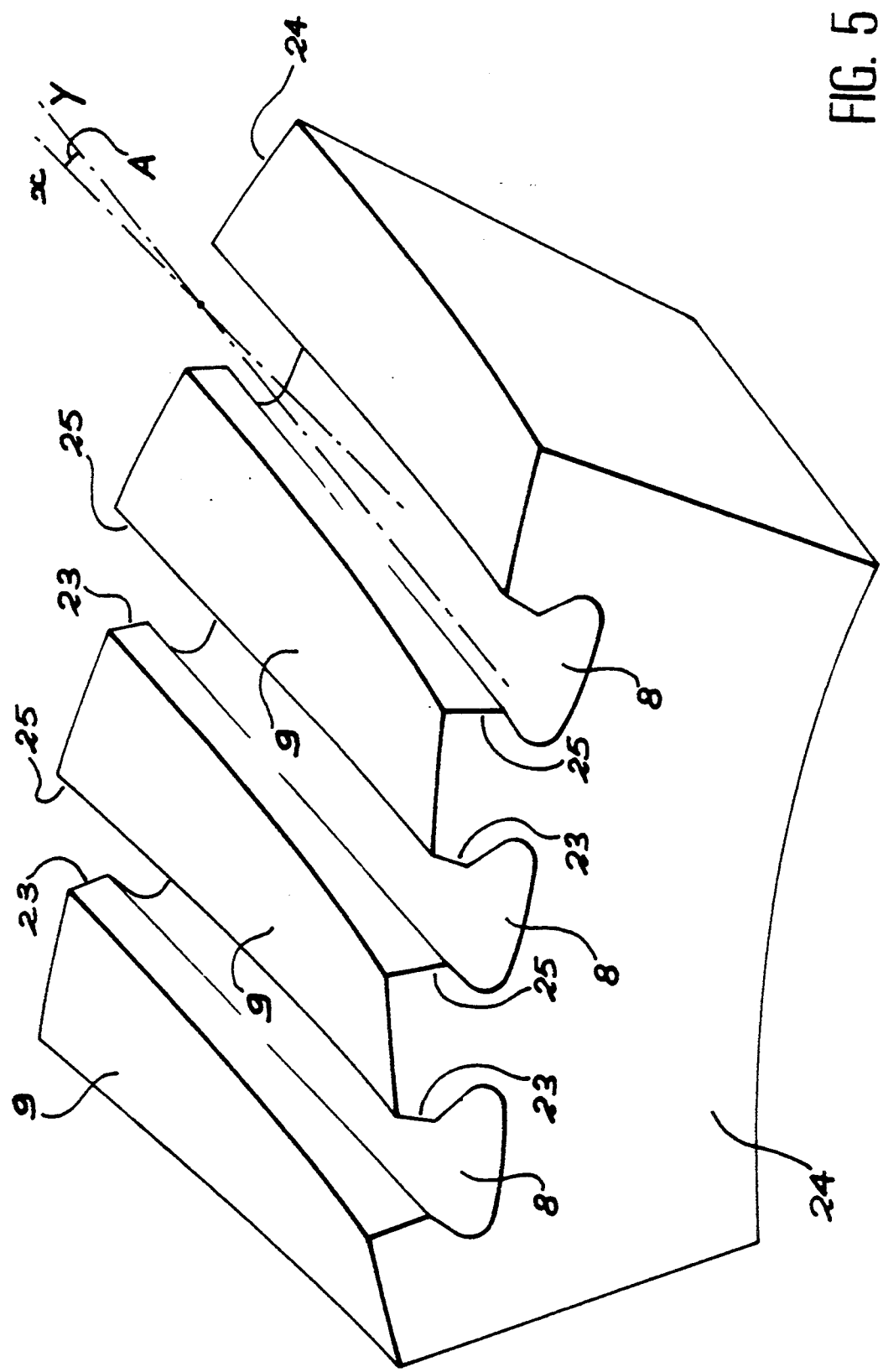
FIG. 5 is an external view of the construction of FIGS. 1 to 4.

The shape of the external face 19 can be twisted or helical with a transition without discontinuity between the three sections shown. This construction is shown in FIG. 5, the teeth 9 and recesses 8 result from oblique pin settings and have a direction Y forming an angle A with the axis X of the disk 2, the portions of the teeth 9 of less height being located at points 23, where the lateral edges of the teeth 9, oriented in the direction Y, intersect the edges 24 of the disk 2 forming an acute angle (90°-A), because the rigidity of these points 23 is not appropriate for points 25 facing the same on the other face of the recess 8 with respect to the forces which occur.

The dimensional and shape variations of these rotor elements are normally continuous, to avoid excessive stress concentrations, but are not necessarily linear along the entire rotor length. They can be more accentuated on part of this length or only apply to said part, the remainder having a uniform section. The designer will make the choice according to the stress distribution desired. It is also possible to take account of the axial evolution of the forces at the vane root to obtain teeth with more complex shapes.

I claim:

1. A turbojet engine rotor, which comprises:
a disk having a plurality of recesses separated by teeth formed from radially outer widened portions and a neck joining the widened portions to a rim of the disk on which all the teeth are located, and
a plurality of vanes which have a blade and a root respectively located in the recesses, wherein for each tooth the widened portions are formed by two adjacent portions, each located on one side of the neck, wherein one widened portion is higher and the adjacent widened portion is of less height in a direction along recesses of the rotor, the adjacent portions being of less height towards acute angle ends of the teeth, and wherein the recesses and teeth are oblique and the teeth have a twisted outer face.

* * * * *